United States Patent
Tsubaki

(10) Patent No.: US 9,832,432 B2
(45) Date of Patent: Nov. 28, 2017

(54) CONTROL APPARATUS, IMAGE PICKUP APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/173,067

(22) Filed: Jun. 3, 2016

(65) Prior Publication Data
US 2016/0360081 A1   Dec. 8, 2016

(30) Foreign Application Priority Data

Jun. 5, 2015   (JP) ................. 2015-115082

(51) Int. Cl.
| | | |
|---|---|---|
| H04N 5/228 | (2006.01) | |
| H04N 9/04 | (2006.01) | |
| H04N 5/232 | (2006.01) | |
| H04N 13/02 | (2006.01) | |

(52) U.S. Cl.
CPC ......... *H04N 9/045* (2013.01); *H04N 5/23264* (2013.01); *H04N 13/0217* (2013.01)

(58) Field of Classification Search
CPC ........... H04N 5/23248; H04N 5/23264; H04N 13/0275
USPC ......................................... 348/208.99, 208.2
See application file for complete search history.

(56) References Cited

U.S. PATENT DOCUMENTS

| | | | |
|---|---|---|---|
| 6,633,664 B1 * | 10/2003 | Minamida | G06K 9/209 345/419 |
| 8,471,915 B2 | 6/2013 | Robinson et al. | |
| 9,131,155 B1 * | 9/2015 | Dolgin | H04N 5/23248 |
| 2012/0327078 A1 * | 12/2012 | Liao | H04N 13/0022 345/419 |

FOREIGN PATENT DOCUMENTS

| | | |
|---|---|---|
| JP | 2014-511591 A | 5/2014 |
| JP | 2014-110043 A | 6/2014 |
| WO | 2012/106068 A2 | 8/2012 |

OTHER PUBLICATIONS

C. Harris et al., "A combined corner and edge detector", Fourth Alvey Vision Conference, pp. 147-151, 1988.
Matsuda, "ICP algorithm", computer vision frontier guide 3, Advanced Communication Media, pp. 33-60, 2003.
D. Nister, "An Efficient Solution to the Five-Point Relative Pose Problem", PAMI Trans. vol. 26, Issue 6, pp. 756-770, 2004.
F. Kahl et al., "Continuous Optimization Methods in Computer Vision", ECCV2006—Tutorial program, May 2006, pp. 154.

* cited by examiner

*Primary Examiner* — Anthony J Daniels
(74) *Attorney, Agent, or Firm* — Cowan, Liebowitz & Latman, P.C.

(57) ABSTRACT

A control apparatus includes a depth information acquirer (3) which acquires depth information of an object image, a position attitude acquirer (8) which acquires position information or attitude information of an apparatus, and an image processor (7, 9) which generates three-dimensional information based on information relating to an optical vibration-proof state of the apparatus, the depth information, and the position information or the attitude information.

17 Claims, 8 Drawing Sheets

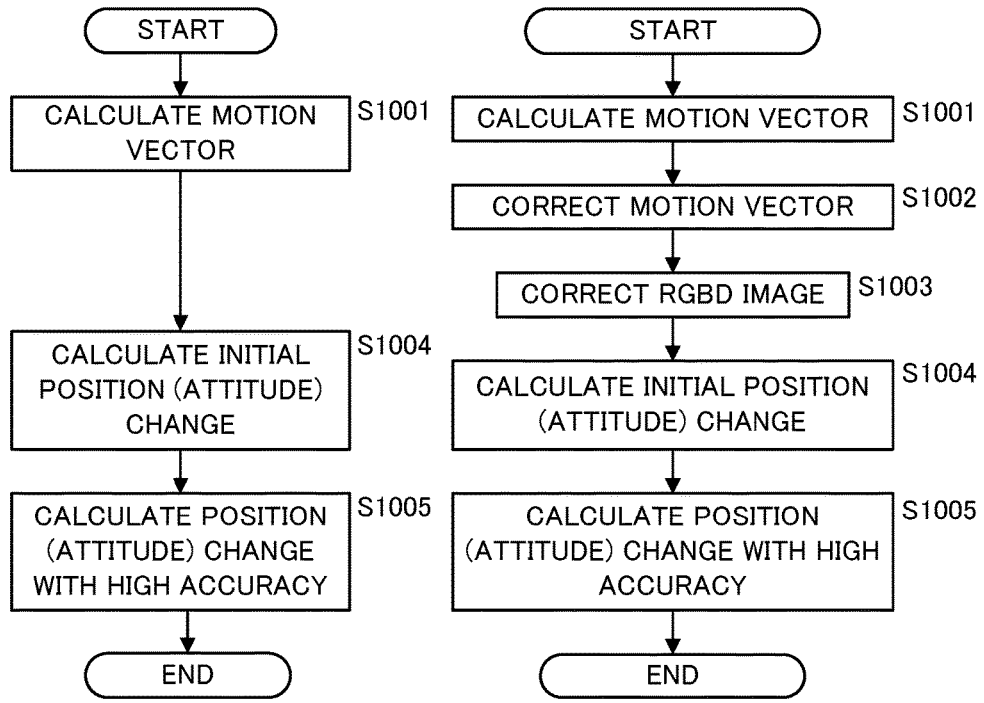
FIG. 10A
FIG. 10B
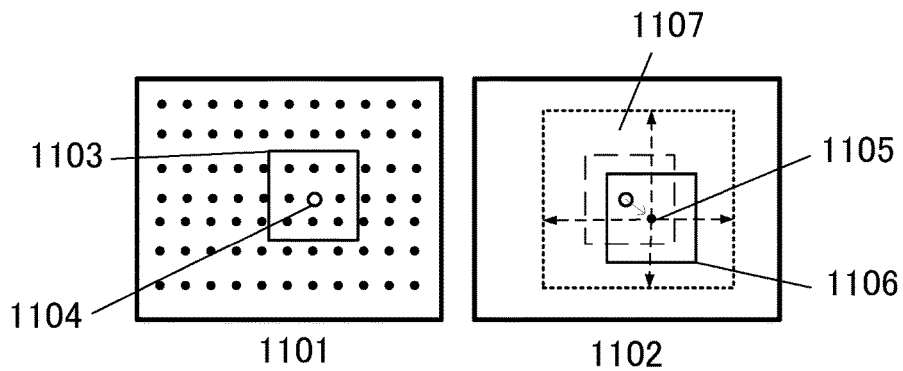
FIG. 11

CONTROL APPARATUS, IMAGE PICKUP APPARATUS, CONTROL METHOD, AND NON-TRANSITORY COMPUTER-READABLE STORAGE MEDIUM

BACKGROUND OF THE INVENTION

Field of the Invention

The present invention relates to an image pickup apparatus which is capable of modeling three-dimensional data.

Description of the Related Art

It is desirable that three-dimensional modeling or space mapping is achieved by using image information or two-dimensional depth information that are acquired by a hand-held camera. In this case, with the use of optical vibration-proof control (image stabilization (IS) control), a motion blur and a motion distortion of an image caused by a hand shake can be reduced, and thus a deterioration of the three-dimensional model and the space map due to the motion blur and the motion distortion can be suppressed. The optical vibration-proof control is especially effective in a photographing scene such as an indoor scene in which a light amount is insufficient, a cloudy weather scene, and a night scene.

U.S. Pat. No. 8,471,915 discloses an image pickup system that corrects a rolling shutter distortion by using optical vibration-proof control and that suppresses a motion blur. Japanese Patent Laid-open No. 2014-110043 discloses an apparatus that generates a three-dimensional model by combining a plurality of partial three-dimensional models when it is necessary to capture a large object that cannot be contained in a field of view or take a close-up photo. Japanese Translation of PCT International Application Publication No. 2014-511591 discloses a method of measuring or calculating position or attitude information of a camera or change information based on a certain origin at the moment of capturing an image or depth information to be used for integration processing. A method of calculating the position or the attitude of the camera during the photography by using a captured image or information acquired by an attitude sensor provided in the camera is called a self-position estimation.

However, when three-dimensional modeling is performed by integrating a color image with an image including depth distance information as disclosed in Japanese Patent Laid-open No. 2014-110043 and Japanese Translation of PCT International Application Publication No. 2014-511591, a displacement occurs even if RGB data captured from each viewpoint are reversely projected in a unified coordinate space to be merged on condition that the optical vibration-proof control is ON. This is because perspective that occurs by a perspective projection and that depends on an optical vibration-proof state is geometrically erroneous. Since a position change (attitude change) of a camera cannot be correctly estimated from an image, it is difficult to improve a quality of the three-dimensional modeling while performing the optical vibration-proof control.

SUMMARY OF THE INVENTION

The present invention provides a control apparatus, an image pickup apparatus, a control method, and a non-transitory computer-readable storage medium which are capable of achieving high-quality and high-accuracy three-dimensional modeling or space mapping to reduce an influence of a motion blur in hand-held photographing or rolling shutter distortion.

A control apparatus as one aspect of the present invention includes a depth information acquirer configured to acquire depth information of an object image, a position attitude acquirer configured to acquire position information or attitude information of an apparatus, and an image processor configured to generate three-dimensional information based on information relating to an optical vibration-proof state of the apparatus, the depth information, and the position information or the attitude information.

An image pickup apparatus as another aspect of the present invention includes an image pickup element configured to photoelectrically convert an object image formed via an optical system to output an image signal, a depth information acquirer configured to acquire depth information of the object image, a position attitude acquirer configured to acquire position information or attitude information of the image pickup apparatus, and an image processor configured to generate three-dimensional information based on information relating to an optical vibration-proof state of the image pickup apparatus, the depth information, and the position information or the attitude information.

A control method as another aspect of the present invention includes the steps of acquiring depth information of an object image, acquiring position information or attitude information of an apparatus, acquiring information relating to an optical vibration-proof state of the apparatus, and generating three-dimensional information based on the depth information, the position information or the attitude information, and the information relating to the optical vibration-proof state.

A non-transitory computer-readable storage medium as another aspect of the present invention stores a program which causes a computer to execute a process including the steps of acquiring depth information of an object image, acquiring position information or attitude information of an apparatus, acquiring information relating to an optical vibration-proof state of the apparatus, and generating three-dimensional information based on the depth information, the position information or the attitude information, and the information relating to the optical vibration-proof state.

Further features and aspects of the present invention will become apparent from the following description of exemplary embodiments with reference to the attached drawings.

BRIEF DESCRIPTION OF THE DRAWINGS

FIGS. 10A and 10B are flowcharts of illustrating calculation processing of an attitude of the image pickup apparatus using RGBD image information in the second embodiment.

FIG. 11 is an explanatory diagram of block matching in the second embodiment.

DESCRIPTION OF THE EMBODIMENTS

Exemplary embodiments of the present invention will be described below with reference to the accompanied drawings.

(First Embodiment)

Figure 1:
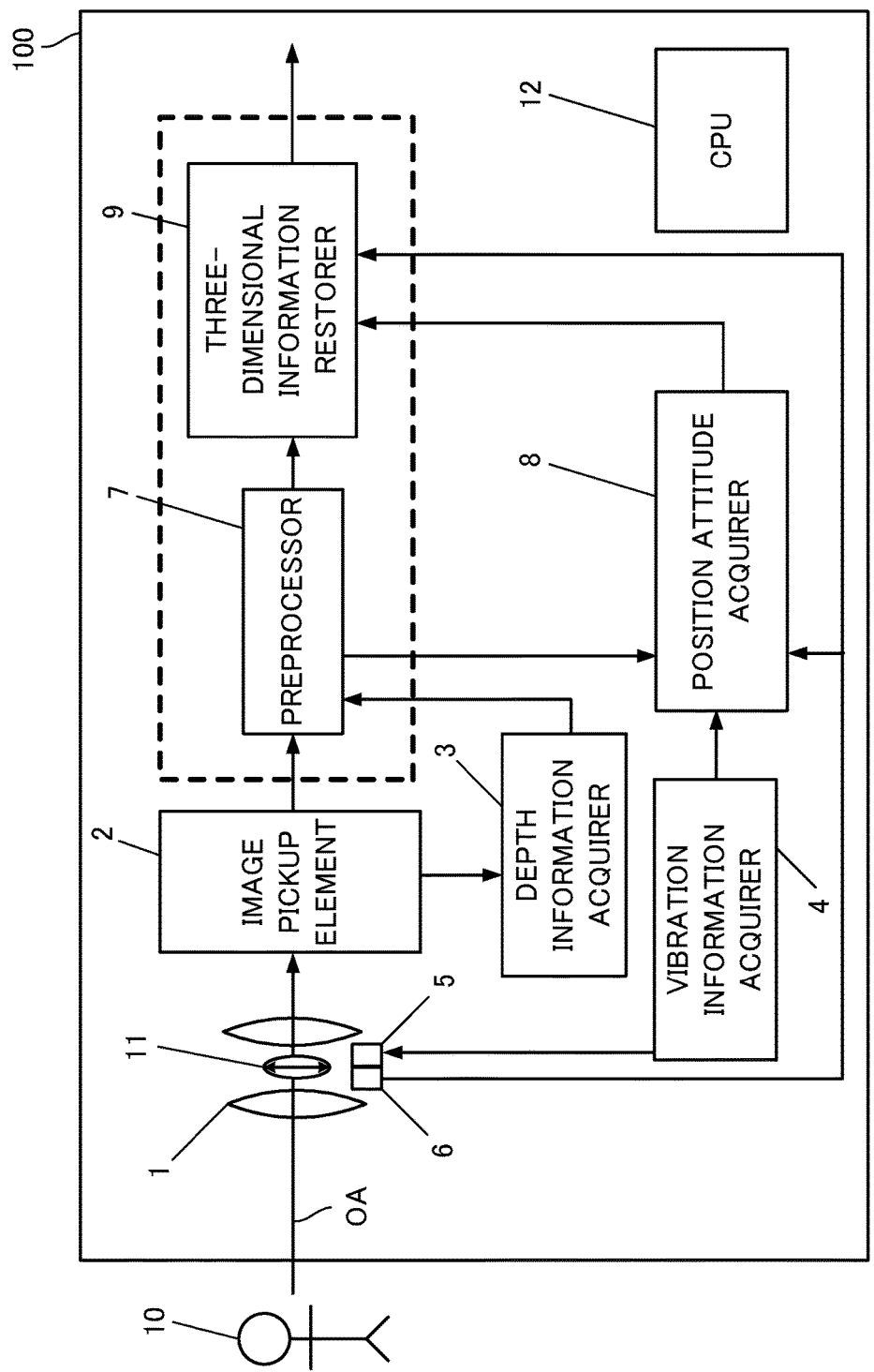
FIG. 1 is a block diagram of an image pickup apparatus in a first embodiment.

First of all, referring to FIG. 1, an image pickup apparatus in a first embodiment of the present invention will be described. FIG. 1 is a block diagram of an image pickup apparatus 100 in this embodiment. The image pickup apparatus 100 is capable of modeling three-dimensional data, and it includes an optical system 1, an image pickup element 2 (image sensor), a depth information acquirer 3, a vibration information acquirer 4, an optical vibration-proof controller 5, an optical vibration-proof control monitor 6, a preprocessor 7, a position attitude acquirer 8, and a three-dimensional information restorer 9. In this embodiment, the preprocessor 7 and the three-dimensional information restorer 9 that perform processing mainly on image information constitute an image processor. The image pickup apparatus 100 includes a CPU 12 (controller) that control each unit of the image pickup apparatus 100.

The optical system 1 (image pickup optical system) is a component which images light from an object 10 on the image pickup element 2, and it includes for example a plurality of lenses and a mirror. The optical system 1 includes a correction member 11 (vibration-proof mechanism such as a correction lens) constituted by a part of the plurality of lenses. The correction member 11 constitutes an optical vibration-proof mechanism that optically corrects an image blur caused by a hand shake of the image pickup apparatus 100. The image pickup apparatus 100 moves (i.e., performs a parallel movement of) the correction member 11 in a direction orthogonal to an optical axis OA to move (i.e., perform a parallel movement of) a position of an optical image (object image) formed on the image pickup element 2 to reduce a swing of an image (image blur) caused by a swing (vibration) of the image pickup apparatus 100. When the optical system 1 is a zoom lens, variable parameters such as a focal length are stored in a memory such as an internal memory of the CPU 12.

The image pickup element 2 optically converts the optical image formed on an imaging plane via the optical system 1 to output an electronic image (image signal). While the image pickup apparatus 100 performs an image blur correction by using the correction member 11 provided in the optical system 1, this embodiment is not limited thereto. For example, instead of the correction member 11, the image pickup element 2 may include a correction member (vibration-proof mechanism) which is constituted by a mechanical drive component such as a piezoelectric element to perform the image blur correction. In this case, the image pickup element 2 is capable of performing the image blur correction (vibration-proof operation) by performing the parallel movement in a plane orthogonal to the optical axis OA of the optical system 1. Instead, a vibration-proof mechanism which controls a range of an image output as an image signal from the image pickup element 2 to electronically control a vibration caused by a hand shake may be provided.

The depth information acquirer 3 acquires two-dimensional depth information that corresponds to each pixel of image information in combination with the image pickup element 2. For example, the image pickup element 2 includes a plurality of pixels for a single microlens ML, and a plurality of microlenses ML are arrayed in two dimensions. In this configuration, the image pickup element 2 is capable of photoelectrically converting a pair of pupil-divided light beams to output a pair of signals (pupil-divided images). The depth information acquirer 3 acquires the pupil-divided images output from the image pickup element 2, and it performs a correlation calculation of image signals based on a phase difference between the acquired two pupil-divided images to determine two-dimensional depth information.

Figure 4A:
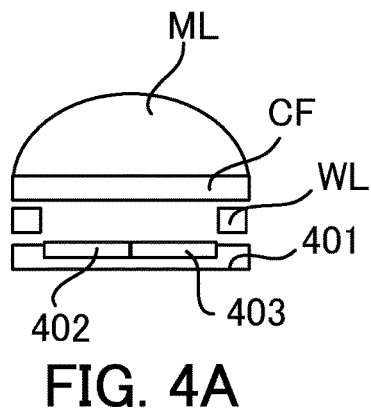
FIGS. 4A to 4C are configuration diagrams of unit pixel cell of an image pickup element in each embodiment.
Figure 4B:
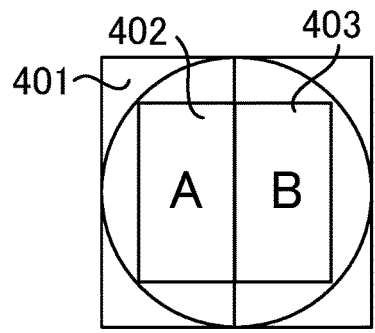
Figure 4C:
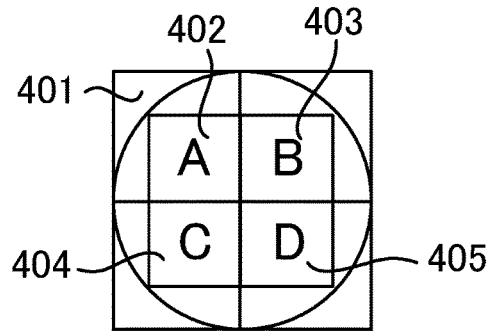

Subsequently, referring to FIGS. 4A to 4C, a structure of the image pickup element 2 will be described. FIGS. 4A to 4C are configuration diagrams of a unit pixel cell (pixel groups) of the image pickup element 2. In this embodiment, the image pickup element 2 includes a plurality of photoelectric converters PD that share a single microlens ML. FIG. 4A is a cross-sectional view of the unit pixel cell. FIG. 4B is a front view of the unit pixel cell including two photoelectric converters that share the single microlens ML (a case in which two-divided photoelectric converters PD share the single microlens ML), and FIG. 4C is a front view of the unit pixel cell including four photoelectric converters that share the signal microlens ML (a case in which four-divided photoelectric converters PD share the signal microlens ML).

As illustrated in FIG. 4A, a unit pixel cell 401 that is constituted by a pixel group corresponding to the microlens ML includes photoelectric converters 402 and 403, the microlens ML, a color filter CF, and a wiring layer WL. When the pixel group is divided into two pixels, as illustrated in FIG. 4B, two photoelectric converters 402 and 403 are arranged in the unit pixel cell 401. When the pixel group is divided into four pixels, as illustrated in FIG. 4C, four photoelectric converters 402, 403, 404, and 404 are arranged in the unit pixel cell 401. In each arrangement of FIGS. 4B and 4C, light (incident light) that is incident on the image pickup element 2 via the optical system 1 passes through the microlens ML and that has spectral characteristics of the color filter CF to be illuminated on each of the photoelectric converters. The color filters CF are arranged repetitively at a constant period for each unit pixel cell.

Figure 5:
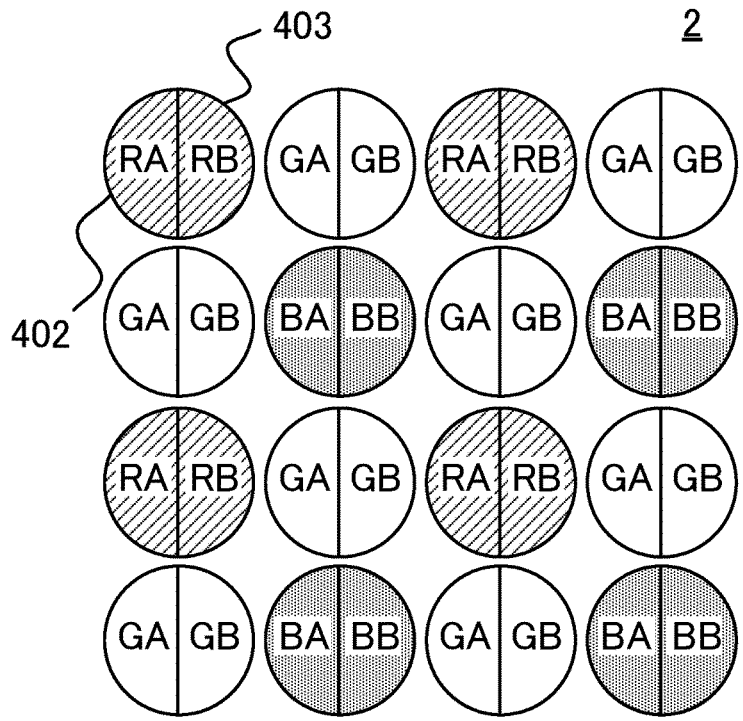
FIG. 5 is a diagram of an arrangement of color filters of the image pickup element in each embodiment.

FIG. 5 is a diagram of the arrangement of the color filters CF, and it illustrates an example in which the pixel group is divided into two pixels (a case in which the photoelectric converters 402 and 403 share the single microlens ML) as illustrated in FIG. 4B. The arrangement of the color filters CF is a typical Bayer array in which sets of red (R), green (G), and blue (B) are arranged periodically. An image which is output from the photoelectric converter 402 (one of divided PDs that share the microlens ML) is an A image, and an image which is output from the photoelectric converter 403 (the other of divided PDs that share the microlens ML) is a B image. In FIG. 5, for example, the photoelectric converters 402 and 403 that are arranged corresponding to a red color filter are represented by RA and RB, respectively. The structure and the characteristics of the image pickup element 2 are the same as those of a typical image pickup element except that the unit pixel cell 401 has a divided structure.

The microlens ML has a role of a field lens with respect to a principal optical system (principal lens) constituted by the optical system 1. Therefore, light beams that are emitted from an exit pupil and that reach each photoelectric converter (divided PD) are limited, and light beams passing through regions (pupil-divided regions) different from each other in the exit pupil reach the respective photoelectric converters. Accordingly, in the unit pixel cell 401, a parallax occurs in pixels with the same arrangement, for example, between an image generated by collecting only pixels corresponding to the photoelectric converters 402 in an entire light-receiving region and an image generated by collecting only pixels corresponding to the photoelectric converters 403. With the use of the parallax between images, it is possible to perform focus detection and stereo image processing. Such an image having the parallax is called a parallax image.

Under a photographing illumination condition of illuminating light with a low coherence such as typical sunlight and a condition of using a consumer optical element, a spatial coherency between divided pupils can be regarded to be low. Accordingly, an image obtained by adding (combining) pixel values of the respective photoelectric converters in the unit pixel cell 401, for example the two divided photoelectric converters 402 and 403 or the four divided photoelectric converters 402, 403, 404, and 405, is approximately equivalent to an image captured by using a conventional optical system which does not divide a pupil. The added image (combined image), i.e., image obtained by adding (combining) the pixel values of the divided PDs, is obtained as an image (captured image) which is the same as that obtained by using a conventional image pickup element after image processing is performed on the added image by using the image processor such as the preprocessor 7.

In this embodiment, the two-dimensional depth information that is output from the depth information acquirer 3 may have a size reduced with respect to a luminance, for example an RGB color image as a normal output from the image pickup element 2. While the depth information acquirer 3 determines the two-dimensional depth information by using a TOF method, a structured optical method, a DFD method, or the like, this embodiment is not limited thereto.

For example, when the depth information acquirer 3 uses a time-of-flight (TOF) method to fly an infrared (IR) pulse, the image pickup apparatus 100 includes a light emitting portion (not illustrated) to emit the infrared light toward an imaging space to detect scattered light backward from an at least one of object surfaces in the imaging space. For example, the image pickup element 2 may be provided with an IR pixel having a sensitivity other than a sensitivity of the R, G, and B pixels. The depth information acquirer 3 for example emits pulsed infrared light from the light emitting portion and calculates a time between the emitted light pulse and an arrived light pulse corresponding to the emitted light pulse that arrives at and is detected by the image pickup element 2 to measure a physical distance from the image pickup apparatus 100 to an object position in an object space. Alternatively, the depth information acquirer 3, for example, compares a phase of the emitted light from the light emitting portion with a phase of the arrived light to determine a phase shift. With the use of this phase shift, an intensity of a reflected light beam can be temporally analyzed by various methods including for example a scattered light pulse imaging. Accordingly, the physical distance from the image pickup apparatus 100 to the object position can be measured with higher accuracy.

For example, the depth information acquirer 3 may adopt a method of determining the depth information based on structured light. In this method, patterned light (for example it is light having a known pattern such as a spot, a grating, and a stripe pattern, and it may be temporally variable) is projected toward the imaging space by using a light emitting portion (not illustrated). This pattern is deformed when being collided on an object surface in a scene. The depth information acquirer 3 analyzes a deformed image of the pattern and measures an absolute distance or a relative distance from the image pickup apparatus 100 to the scene.

For example, the depth information acquirer 3 may adopt a method of comparing at least two images with the same angle of field and different focus positions to acquire distance information of an object for each angle of field region of an image. As this method, there are a method of estimating a distance by using an edge difference, a method of using DFD (Depth From Defocus), and the like.

The image pickup element 2 may be provided with pupil-divided pixels (focus detection pixels) by which focus detection by a phase difference method can be performed in a typical pixel arrangement in the image pickup element 2, and the depth information acquirer 3 may measure the distance based on outputs from the focus detection pixels and complement the distance to form two-dimensional distance information. Alternatively, a range-finding sensor (focus detection sensor) for a distance measurement may be provided separately from the image pickup element 2. For example, a range-finding sensor for the distance measurement such as a laser range finder can be provided.

The vibration information acquirer 4 includes an attitude sensor such as a gyro, an acceleration sensor, a geomagnetic compass, and an inclination sensor, and it measures change information of a position or an attitude of the image pickup apparatus 100. The attitude sensor detects a change of the position or the attitude in a plurality of axial directions of the optical system 1. For example, the gyro detects the change of the attitude in each of a yaw direction and a pitch direction that are orthogonal to the optical axis OA and a roll direction that is parallel to the optical axis OA. Instead of the attitude sensor for each axis, a multiaxis attitude sensor that is capable of detecting the attitude in the plurality of axial directions may be used. Output signals of the attitude sensor may be integrated by using the CPU 12, and the vibration information acquirer 4 may be configured to output an attitude change amount (position change amount) in synchronization with a frame rate of an image output. Alternatively, the vibration information acquirer 4 may be output the attitude change amount (position change amount) with higher accuracy in combination with information of the gyro or the acceleration sensor. A GPS (Global Positioning System) or the like may be combined in order to improve a position accuracy.

The optical vibration-proof controller 5 includes a displacement element, and it shifts a lens which performs the optical vibration-proof operation (i.e., correction member 11 as a correction lens) in a direction orthogonal to the optical axis OA. The optical vibration-proof controller 5 performs vibration-proof control (i.e., image stabilization) by shifting the lens (correction member 11) as a part of the optical system 1 based on an attitude change (position change) of the image pickup apparatus 100 obtained by the vibration information acquirer 4, that is, based on a camera work. Specifically, the optical vibration-proof controller 5 performs the vibration-proof control by using an electromagnetic element or the like. The optical vibration-proof controller 5 performs time series processing, specifically calculates integration on information relating to the attitude change (position change), i.e., change information on a position or an attitude, output from the vibration information acquirer 4 and it performs open-loop processing to cancel a motion in an image to achieve the optical vibration-proof control. For the integration processing, for example filtering processing such as IIR (Infinite Impulse Response) is used. The optical vibration-proof controller 5 adjusts a cutoff frequency, a feedback gain, or the like, or it performs an offset subtraction, and accordingly it can adjust characteristics of a vibration-proof frequency, a low frequency component relief, or the like. If the correction member 11 is provided to the image pickup element 2, the optical vibration-proof controller 5 controls a parallel movement of the image pickup element 2 (movement in a direction orthogonal to the optical axis OA) instead of the lens (correction lens) as a part of the optical system 1.

The optical vibration-proof control monitor 6 includes a hall element or an encoder, and it measures a parallel movement (moving amount) of the correction member 11 to output a measured value. If a high accuracy is not required for the measured value, control information of the correction member 11 output from the optical vibration-proof controller 5 may be directly converted to acquire the measured value. The optical vibration-proof control information (measured value) is sampled in synchronization with an image capturing timing in the image pickup element 2, and it is recorded together with the image information.

The preprocessor 7 performs processing of converting an image signal output from the image pickup element 2 into a single luminance image or a luminance image of a single frame or an RGB color image. The preprocessor 7 includes a front end unit that performs front end processing and a back end unit that performs back end processing. The front end unit performs basic processing such as a noise reduction by a correlated double sampling (CDS), exposure control by gain-up according to auto gain control (AGC), a black level correction, an A/D conversion, and the like, on the image signal (analog image signal) from the image pickup element 2. Thus, the front end unit converts the analog image signal into a digital signal to generate a digital image signal. The front end unit mainly performs preprocessing on the analog image signal, and accordingly a main part of the front end unit is called an AFE (analog front end). The front end unit which is used together with a digital output sensor is called a DFE (digital front end).

The back end unit of the preprocessor 7 performs image processing of the back end (back end processing) on the digital image signal such as Bayer array interpolation, linearization matrix processing, white balance adjustment, YCC conversion, color difference correction, gradation correction, contrast correction, and edge enhancement. Furthermore, the back end unit may perform image processing such as dynamic lens extension processing that generates a wide dynamic range image by synthesizing a plurality of images and super-resolution processing. The back end processing is called DBE (digital back end) processing as contrasted with the AFE processing of the front end unit. The preprocessor 7 performs the front end processing and the back end processing to generate output image information that forms a single image (still image) or a moving image. In this embodiment, the luminance image or the color image (RGB image) generated by the preprocessor 7 and the two-dimensional depth information acquired by the depth information acquirer 3 are collectively referred to as RGBD image information.

The position attitude acquirer 8 (camera position attitude acquirer) determines the attitude (attitude information) or the position (position information) of the image pickup apparatus 100 in each frame photographing based on the attitude change amount (position change amount) of the image pickup apparatus 100 (camera) acquired by the vibration information acquirer 4. The position attitude acquirer 8 may use the RGBD image information output from the preprocessor 7 to improve the accuracy of the attitude or the position of the image pickup apparatus 100. In this case, in order to remove an influence of the optical vibration-proof operation given to the RGBD image information, the position attitude acquirer 8 uses the optical vibration-proof control information output from the optical vibration-proof control monitor 6. Hereinafter, in this embodiment, it is assumed that the attitude (position) of the image pickup apparatus 100 in each frame photographing is an attitude (position) obtained by simple integration of the attitude change amount (position change amount) of the image pickup apparatus 100 with reference to a certain photographing frame as a basing point.

The three-dimensional information restorer 9 generates three-dimensional (3D) model data or environmental map data. The data are generated based on the RGBD image information output from the preprocessor 7, the attitude information (position information) of the image pickup apparatus 100 acquired in capturing each frame output from the position attitude acquirer 8, and the optical vibration-proof control information output from the optical vibration-proof control monitor 6.

Next, reproduction of the three-dimensional environment will be described. As an example, a three-dimensional mode in a real world environment is generated in a three-dimensional space constituted by voxels stored in a memory device. This model is constructed by data describing a position and a direction of the image pickup apparatus 100 and a depth image having a pixel that indicates a distance from the image pickup apparatus 100 to one point in an object environment. The existence and the value are sequentially calculated for each voxel that forms an object space as a three-dimensional space. For each voxel, according to brute force processing of the image pickup apparatus 100 by using positions and directions of the image pickup apparatus 100 that captures the RGBD image data, a corresponding depth image and its pixel position are determined for the related voxel. Then, a coefficient relating to a distance between the related voxel and a point at a corresponding point in the object space is determined, and the value stored for the related voxel is updated by using this coefficient. In this case, the relation to the voxel position is determined by the reverse projection as a reverse process based on a pinhole model on the assumption that a process in photography is a perspective projection. According to the brute force processing of the image pickup apparatus 100, the voxel is updated by the RGBD image data in a visible state, and a final voxel value is obtained. Then, repetition processing performed for each equivalent voxel in a remaining three-dimensional space and the process of updating the stored value is repeated, and accordingly the three-dimensional mode in the real world environment can be obtained as a voxel expression.

Typically, there are various expression methods as a three-dimensional expression. For example, there is a volume model as a three-dimensional discrete model that is reconstructed as a collection of voxels and a solid model that represents a three-dimensional shape as a combination of simple three-dimensional shapes in a geometric model. Furthermore, there are a spline patch that approximates a free curved surface by a polyhedron with a curved line patch according to a spline curved line, and a three-dimensional mesh model that approximates an object surface by apexes and triangles. These expression methods are typically convertible each other, and similarly to the voxel expression in this embodiment, they can be generated from the RGBD image. Accordingly, in this embodiment, descriptions relating to the creation by using other three-dimensional expression methods are omitted.

Figure 2:
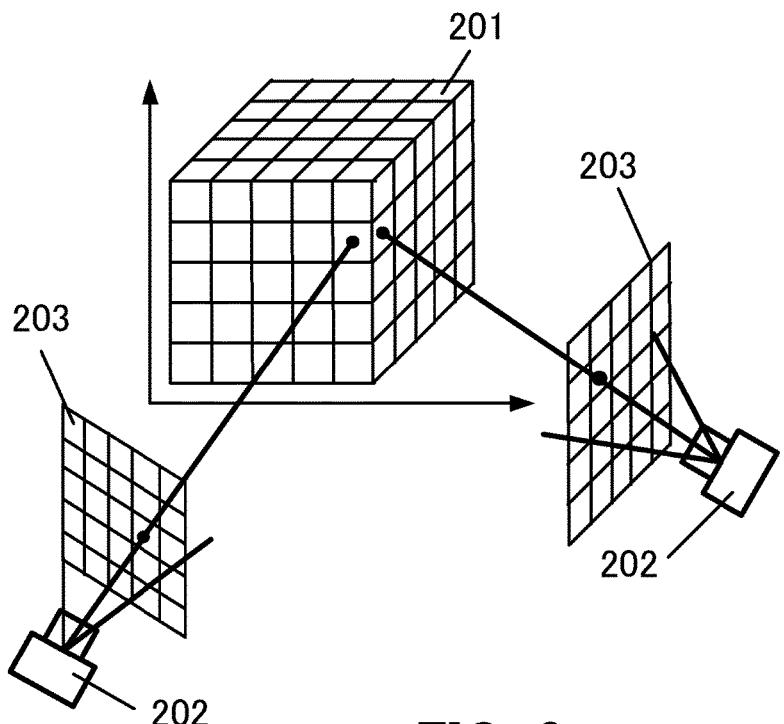
FIG. 2 is an explanatory diagram of generating three-dimensional data by generation of voxels in the first embodiment.

FIG. 2 is an explanatory diagram of generating three-dimensional data by generation of voxels in this embodiment. FIG. 2 illustrates a relationship of a voxel 201 as a space point, a camera 202 (corresponding to the image pickup apparatus 100), and each pixel 203 as an RGBD image. By performing all possible searches with respect to the voxel 201, the camera 202, and the pixel 203, three-dimensional model data obtained by integration of 2.5D data can be generated.

Generation of a basic RGBD image which is obtained without using the optical vibration-proof operation and a generation of three-dimensional model data in a real world environment from camera position attitude data which are synchronously recorded, especially generation of voxel data, are described in detail in Japanese Translation of PCT International Application Publication No. 2014-511591, and accordingly detailed descriptions thereof are omitted. With respect to the generation of the three-dimensional data described above, for simplifying descriptions, all possible combinations of the three-dimensional point (voxel) in a space, the captured RGBD image, and each pixel of each captured RGBD image are looped to be sequentially processed. However, as disclosed in Japanese Translation of PCT International Application Publication No. 2014-511591, if parallel processing is performed on each voxel or similarity calculations of data are collectively performed, a load of processing can be reduced and variation of the processing is not limited to this embodiment.

In the description of the generation of the three-dimensional model data in the real world environment by the three-dimensional information restorer 9, with respect to the correspondence between the pixel of the depth image and the voxel corresponding to the pixel in a three-dimensional space, it is assumed that the process during the photography is a perspective projection, and the relationship to the voxel position is related by the reverse projection. When the optical vibration-proof control is not performed, it is optically correctly operated. On the other hand, when the optical vibration-proof control is performed, as illustrated in FIGS. 3A to 3D, the optical vibration-proof operation is not performed as expected during the photography.

Figure 3A:
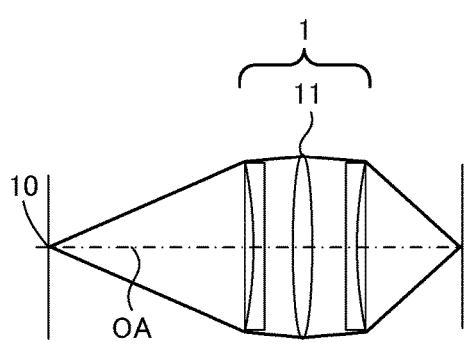
FIGS. 3A to 3D are explanatory diagrams of an influence on a pinhole camera model of an optical vibration-proof operation in the first embodiment.
Figure 3B:
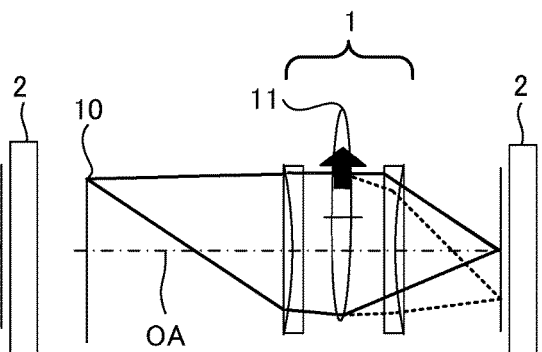
Figure 3C:
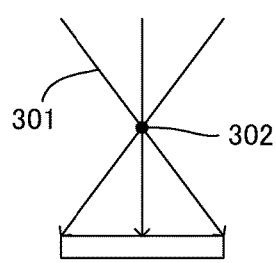
Figure 3D:
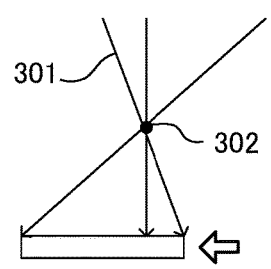

FIGS. 3A to 3D are explanatory diagrams of an influence on a pinhole camera model of the optical vibration-proof operation in this embodiment. FIG. 3A illustrates a state of the optical system 1 which does not perform the vibration-proof control, and FIG. 3B illustrates a state of the optical system 1 which performs the vibration-proof control to shift an image in a direction orthogonal to the optical axis OA. FIG. 3C illustrates a diagram of replacing the optical system 1 with the pinhole model in the state illustrated in FIG. 3A (i.e., state in which the vibration-proof control is not performed). An intersection 302 of a ray 301 corresponds to a viewpoint of the image pickup apparatus 100. FIG. 3D illustrates a diagram of replacing the optical system 1 with the pinhole model in the state illustrated in FIG. 3B (i.e., state in which the vibration-proof control is performed). Comparing FIG. 3C with FIG. 3D, in FIG. 3C, perspectives for a three-dimensional image are equally captured since distances and azimuths from both ends of the image to the viewpoint (intersection 302) are equal to each other. On the other hand, in FIG. 3D, the distances and the azimuths from both ends of the image to the viewpoint are not equal to each other. As described above, when the three-dimensional image is captured, influences of the perspectives at the left end and at the right end of the image are different from each other even if an object with a depth, which is located at the same distance and has the same size, is captured.

Figure 6A:
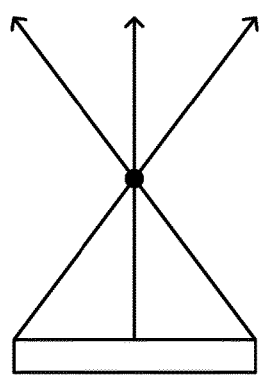
FIGS. 6A and 6B are explanatory diagrams of a reverse projection considering an influence of the optical vibration-proof operation in the first embodiment.
Figure 6B:
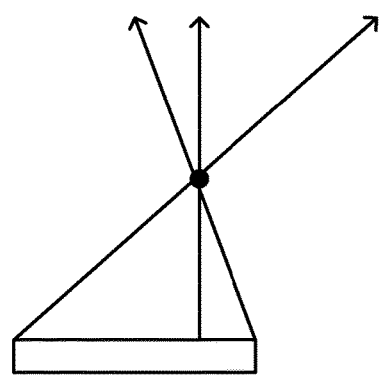

FIGS. 6A and 6B are explanatory diagrams of the reverse projection considering the influence of the optical vibration-proof operation. When the three-dimensional point in the space and the RGBD image point are related with each other by the reverse projection to integrate the three-dimensional model (three-dimensional model data), it is possible to perform the reverse projection accurately according to a typical pinhole assumption as illustrated in FIG. 6A while the optical vibration-proof control is not performed (i.e., while the optical vibration-proof operation is OFF). On the other hand, while the optical vibration-proof control is performed (while the optical vibration-proof operation is ON), as illustrated in FIG. 6B, it is necessary to determine a corresponding point to the three-dimensional point in the space by the reverse projection in the space based on an arrangement relationship between the viewpoint and the RGBD image considering an eccentricity of the viewpoint during the photography.

Figure 7A:
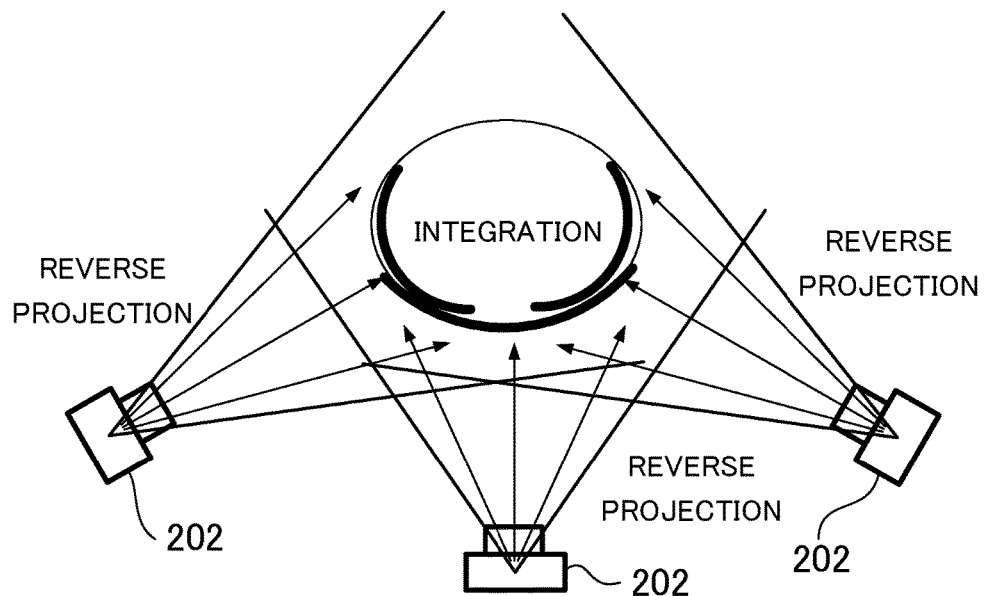
FIGS. 7A and 7B are explanatory diagrams of a three-dimensional model integration by the reverse projection in the first embodiment.
Figure 7B:
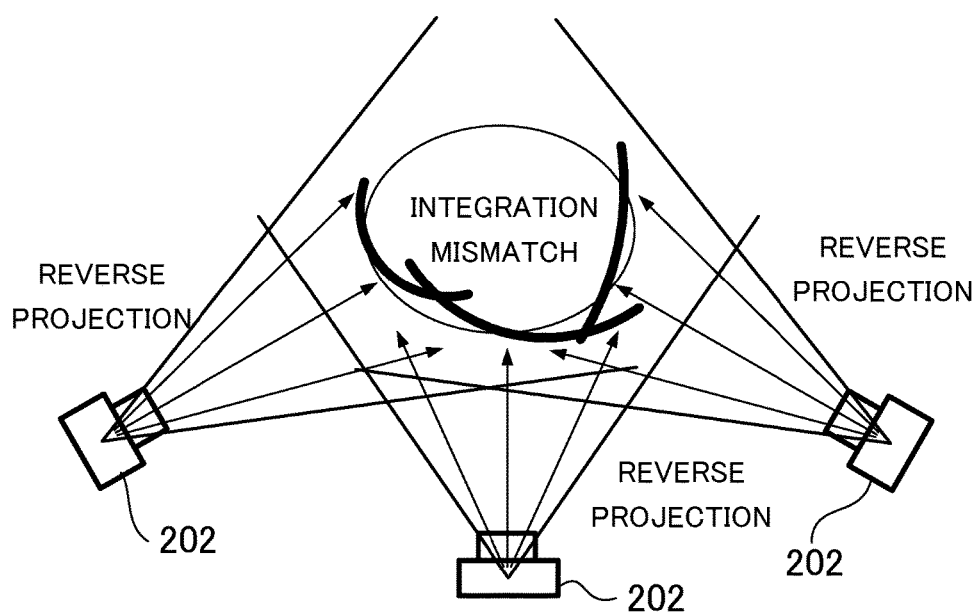

FIGS. 7A and 7B are explanatory diagrams of a three-dimensional model integration by the reverse projection. FIG. 7A illustrates an example in which the RGBD image arrangement is corrected with respect to the viewpoint considering an eccentric amount of the correction member 11, which is determined during the photography, at the time of performing the reverse projection, and the reverse projection is performed considering the influence of the optical vibration-proof control to generate the three-dimensional model in the case where the optical vibration-proof operation is OFF and ON. If the two-dimensional depth information and the attitude (position) of the image pickup apparatus 100 during the photography can be correctly measured, the integration can be achieved accurately in a geometrically consistent state (matched state).

On the other hand, a case in which the RGBD image is captured while the eccentricity occurs by the optical vibration-proof control during the photography as illustrated in FIG. 3B and the optical vibration-proof state during the photography is not considered when integrating the three-dimensional model is considered. In this case, when the reverse projection is performed on the assumption of a camera model in a non-eccentric and a vibration-proof OFF states as illustrated in FIG. 6A, a displacement of the integrated three-dimensional model occurs as illustrated in FIG. 7B. Accordingly, when integrating the three-dimensional model by the reverse projection, the three-dimensional information restorer 9 uses optical vibration-proof control information that is measured by the optical vibration-proof control monitor 6 during the photography to perform the reverse projection while the relationship in the camera model between the viewpoint in the reverse projection and the RGBD image plane is eccentric. As a result, the three-dimensional information restorer 9 is capable of restoring the three-dimensional model which is not affected by the optical vibration-proof control.

Figure 8:
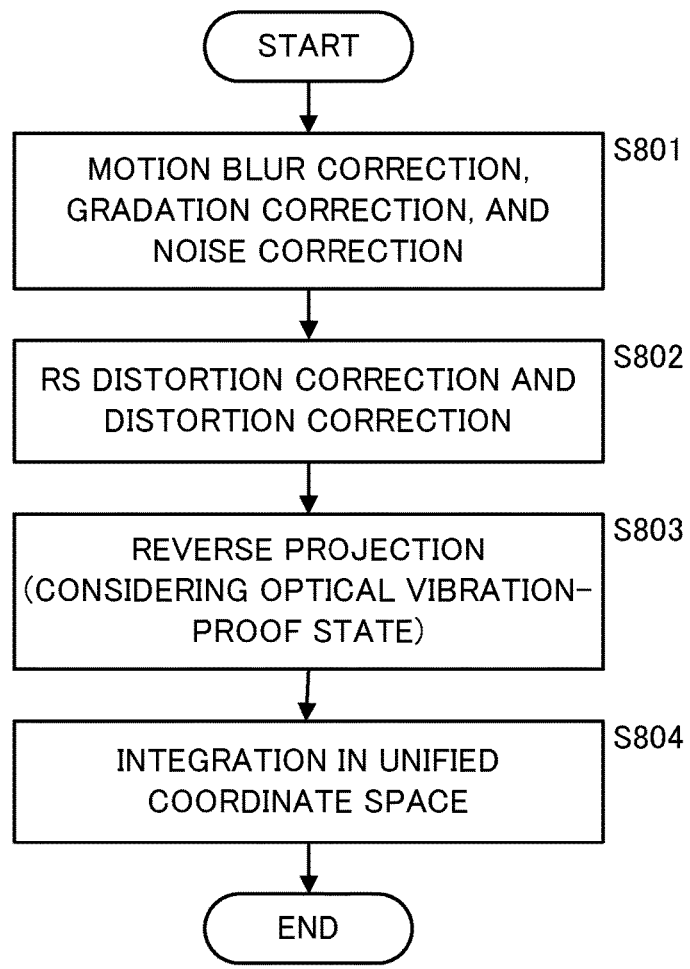
FIG. 8 is a flowchart of illustrating processing of restoring a three-dimensional mode from RGBD image data in the first embodiment.

Next, referring to FIG. 8, processing of restoring a three-dimensional model from RGBD image data (captured RGBD image data) will be described. FIG. 8 is a flowchart of illustrating the processing of restoring the three-dimensional model from the RGBD image data. The flow in FIG. 8 includes step S801 of performing a motion blur correction, a gradation correction, and a noise correction, step S802 of performing a rolling shutter (RS) distortion correction and a distortion correction, step S803 of performing a reverse projection (considering an optical vibration-proof state), and step S804 of performing an integration in a unified coordinate space. Each step is performed by the three-dimensional information restorer 9 based on an instruction of the CPU 12.

First, at step S801, the three-dimensional information restorer 9 corrects a deterioration especially for RGB image data in the RGBD image. The three-dimensional information restorer 9 mainly performs the gradation correction, filtering processing, and a simple synthesis processing on a plurality of images to correct the deterioration of an image.

With respect to the gradation correction, the three-dimensional information restorer 9 corrects for example a deterioration of the gradation caused by a decrease in peripheral illumination or a deterioration relating to a color. The three-dimensional information restorer 9 retrieves (reads) a correction table from a memory (not illustrated) based on a focal length stored in the CPU 12 or a camera parameter such as a focus distance to correct the decrease of the gradation, a color displacement, and a chromatic aberration at the periphery caused by the decrease in peripheral illumination. With respect to the noise processing (noise correction), for a case of capturing a moving image, the three-dimensional information restorer 9 acquires a weighted average of previous and next frames (adjacent frames) or an excessive exposure frame captured with a short-time exposure to perform noise reduction processing in which random noise components are suppressed.

With respect to the motion blur correction, the three-dimensional information restorer 9 performs addition synthesis processing or averaged addition synthesis processing on a plurality of low-exposure images captured with a short-time exposure considering an offset to acquire a RGB image in which the motion blur has been reduced. Alternatively, the three-dimensional information restorer 9 creates a blur kernel based on motion information of the image pickup apparatus 100 acquired from the vibration information acquirer 4 and performs deconvolution filtering processing to acquire the RGB image in which the motion blur has been reduced. As described above, the three-dimensional information restorer 9 performs the corrections such as the gradation correction, the noise correction, and the motion blur correction each of which can be coped with by the gradation correction processing, the addition average processing, or the filtering processing to improve the quality of the captured RGBD image.

Subsequently, at step S802, with respect to each of the captured RGBD images, the three-dimensional information restorer 9 corrects a distortion relating a geometric position of a pixel such as a radiation distortion or a tangent distortion that occurs depending on an RS distortion in a frame or a distortion of an optical system, and an eccentric distortion that occurs according to a drive of the optical vibration-proof operation. As described above, the three-dimensional information restorer 9 corrects the captured RGBD image to an RGBD image which does not include the distortion relating the geometric position of the pixel such as the RS distortion and the distortion. This distortion is corrected based on camera parameters such as a focal length stored in the CPU 12 and a focus distance, and distortion correction information of the optical system 1 selected as parameters (arguments) of the camera parameters. Furthermore, this distortion is corrected based on change information of the attitude (position) of the image pickup apparatus 100 acquired by the vibration information acquirer 4 and optical vibration-proof control information measured by the optical vibration-proof control monitor 6.

The three-dimensional information restorer 9 corrects an influence of the aberration of the optical vibration-proof control and a blur and a distortion that have been partially suppressed and corrected by the optical vibration-proof operation for each RGBD image. With respect to the two-dimensional depth image data, a geometric correction is performed based on an RGBD pixel corresponding to each depth pixel. For each captured RGBD image, image data that do not include any gradation deterioration and any distortion can be generated according to the processing described above. An influence on a perspective caused by the optical vibration-proof control can be coped with at step S803 described below.

Subsequently, at step S803, the three-dimensional information restorer 9 performs the reverse projection considering the optical vibration-proof state. Specifically, as described referring to FIG. 6B, the three-dimensional information restorer 9 performs the reverse projection on the RGBD image considering a displacement of a perspective projection camera model according to the optical vibration-proof control, and it generates three-dimensional points corresponding to specific captured RGBD image data. The three-dimensional information restorer 9 considers a change of a position of the projection center of the camera as a viewpoint of the image pickup apparatus 100 (camera 202) that varies relatively to the RGBD image according to the optical vibration-proof control. Thus, data that represent a range of a three-dimensional shape of a certain object that can be viewed in one direction is also called 2.5D data. The 2.5D data have a lack of information relating to a rear side and an inside of an object. When a three-dimensional mode is generated based on voxels, the relationship between each pixel in the RGBD image of each camera 202 and the voxel data in a space are associated based on the attitude (position) of the camera 202 and the depth data of the RGBD image to calculate the contribution coefficient of the voxel data.

Subsequently, at step S804, the three-dimensional information restorer 9 performs the integration in the unified coordinate space. As illustrated in FIG. 7A, the three-dimensional information restorer 9 synthesizes (combines) the 2.5D data including the three-dimensional points generated from each captured RGBD image (i.e., three-dimensional point data in each of the 2.5D data) with the three-dimensional mode data in the unified coordinate space to be integrated. In this case, the three-dimensional information restorer 9 synthesizes the three-dimensional point data in each of the 2.5D data with the three-dimensional model data in the unified coordinate space based on the contribution coefficient calculated at step S803.

As described above, the image pickup apparatus of this embodiment performs the reverse projection of the three-dimensional point data in the three-dimensional mode space considering the optical vibration-proof state determined when capturing the RGBD image data. As a result, the photography of the RGBD data image for generating the three-dimensional model and the optical vibration-proof operation can be combined. Accordingly, the generation of high-quality and high-accuracy model or three-dimensional space map which is not affected by a motion blur in hand-held photographing or rolling shutter distortion can be achieved.

(Second Embodiment)

Figure 9:
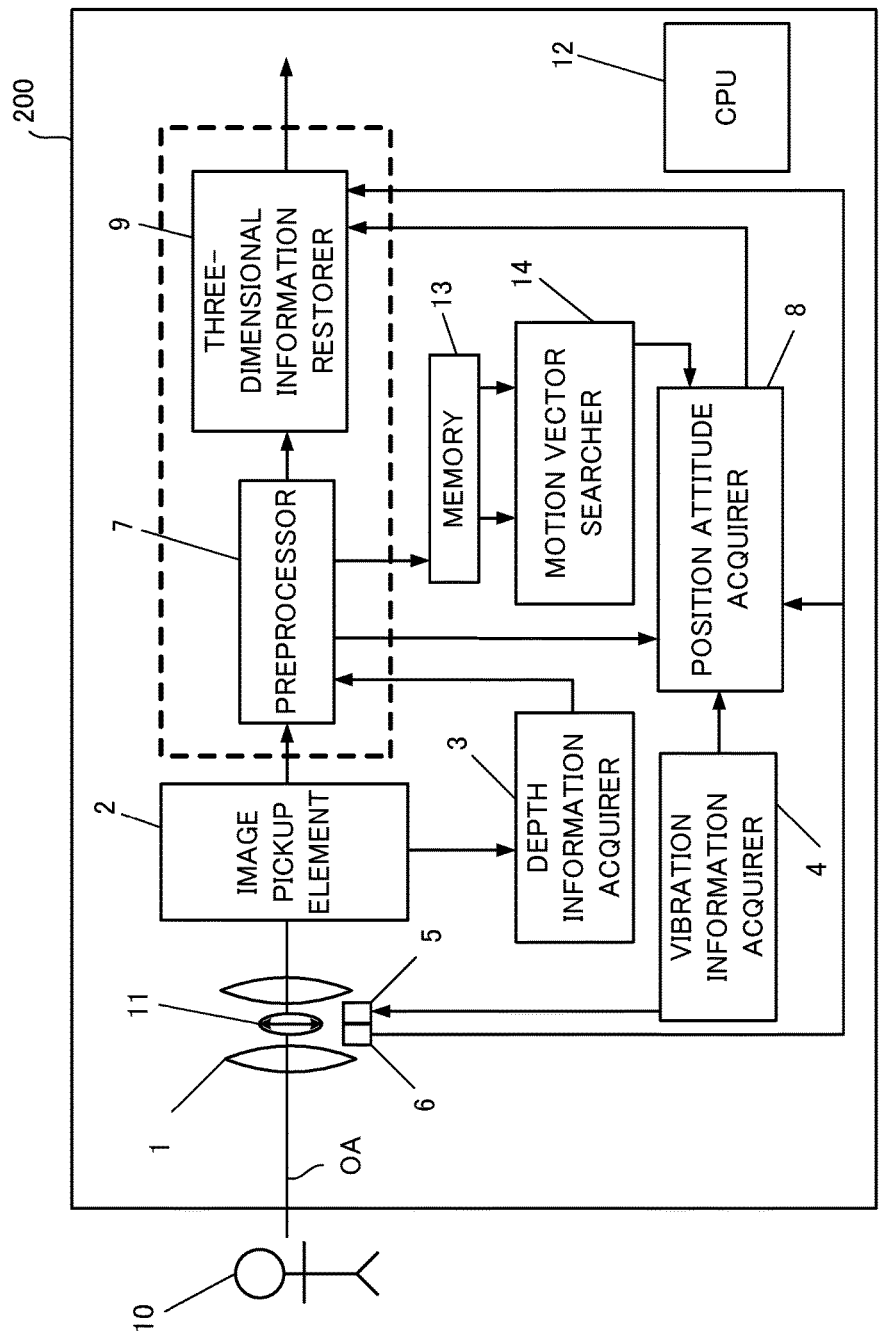
FIG. 9 is a block diagram of an image pickup apparatus in a second embodiment.

Next, a second embodiment of the present invention will be described. FIG. 9 is a block diagram of an image pickup apparatus 200 in this embodiment. The image pickup apparatus 200 is different from the image pickup apparatus 100 of the first embodiment in that the image pickup apparatus 200 includes a memory 13 and a motion vector searcher 14. Other configurations of the image pickup apparatus 200 are the same as those of the image pickup apparatus 100, and accordingly descriptions thereof are omitted.

The memory 13 (memory unit) is an image memory that records captured RGBD image data. For example, the memory 13 records two previous frames adjacent to each other or previous and subsequent frames adjacent to each other with respect to the RGBD image data for searching the motion vector in a moving image. The motion vector searcher 14 searches a motion vector, that is, a corresponding point, between a pair of RGBD image data output from the memory 13.

In the first embodiment, for simple descriptions, the position attitude acquirer 8 simply calculates the position of the image pickup apparatus 100 based on the attitude change amount (position change amount) of the image pickup apparatus 100 acquired from the vibration information acquirer 4 basically. On the other hand, in this embodiment, in order to calculate the attitude (position) of the image pickup apparatus 200 with higher accuracy, the position attitude acquirer 8 uses RGBD image information output from the preprocessor 7.

Output information of the vibration information acquirer 4 including an attitude sensor (position sensor) such as a gyro and an acceleration sensor is a change amount (i.e., variation), such as an acceleration and an angular velocity, relating to an attitude (position) of the image pickup apparatus 200. The performance of the vibration information acquirer 4 including the attitude sensor is easily affected by a dynamic range or a sensitivity of a sensor device and an absolute accuracy of an integrated attitude (position) of the image pickup apparatus 200 in a long-term photography cannot be easily obtained. Accordingly, it is preferred that a calculation accuracy of a change of the attitude occurring between arbitrary frames is improved by using the relationship of the captured RGBD image data. The arbitrary frames may be adjacent frames or separated frames stored in the memory 13.

Next, referring to FIGS. 10A and 10B, calculation processing of the attitude (position) of the image pickup apparatus 200 using the motion vector and the RGBD image information will be described. FIGS. 10A and 10B are flowcharts of illustrating the calculation processing of the attitude of the image pickup apparatus 200 using the RGBD image information. Each step in FIGS. 10A and 10B is performed by the memory 13, the motion vector searcher 14, or the position attitude acquirer 8 based on an instruction of the CPU 12.

First, for simplifying descriptions, referring to FIG. 10A, a case in which the optical vibration-proof control is not performed will be described. The flowchart illustrated in FIG. 10A includes step S1001 of calculating a motion vector, step S1004 of calculating initial position (initial attitude), and step S1005 of calculating a position change (attitude change) with high accuracy.

In order to use the RGBD image information efficiently, an initial value of a relative attitude change amount (position change amount) of the image pickup apparatus 200 between the RGBD images is to be obtained. Accordingly, first, at step S1001, the motion vector searcher 14 obtains a motion vector, that is, a corresponding point, between images. Subsequently, at step S1004, the position attitude acquirer 8 obtains, as the initial value, the attitude change (initial position or attitude) of the image pickup apparatus 200 by using a certain pair of RGBD images and the corresponding point to obtain the initial value of the relative attitude change amount of the image pickup apparatus 200 between the RGBD images. Subsequently, at step S1005, the position attitude acquirer 8 determines a high-accuracy position change amount (attitude change amount) according to a three-dimensional registration using the pair of RGBD images.

FIG. 10B is a flowchart in which processing which is needed to perform the optical vibration-proof control is added to the flow of FIG. 10A. Subsequent to step S1001 of FIG. 10A, step S1002 of correcting the motion vector and step S1003 of correcting the RGBD image are added. Steps S1004 and S1005 are subsequently performed after step S1003 similarly to FIG. 10A. As described above, the flow of FIG. 10B additionally includes processing which removes the influence of the optical vibration-proof control included in the extracted vector and the captured RGB image from the vector and the image, respectively.

First, at step S1001, the motion vector searcher 14 calculates a motion vector or a corresponding point between input arbitrary RGBD images. The motion vector is typically calculated between the RGB images. For the purpose of calculating the motion vector, the motion vector between frames or a locus between feature points is calculated by template matching, key point matching between the feature points calculated in each frame, a motion vector estimation based on a gradient method, or the like.

Referring to FIG. 11, a block matching as a kind of the template matching that is performed by the motion vector searcher 14 will be described. FIG. 11 is an explanatory diagram of the block matching. An image 1101 at the left side in FIG. 11 is a reference image, and an image 1102 at the right side in FIG. 11 is a search image. For example, a video frame that is previously input is set as the reference image and a current video frame that is subsequently input is set as the search image to detect the motion vector in the search image.

A partial area with a predetermined size centered around a target point 1104 arranged in a grid array in the reference image (image 1101) is set as a template 1103. An arbitrary search range 1107 (search area) in the search image (image 1102) is set to search a position at which the template 1103 most closely matches while sequentially moving. Then, a similarity of a partial area 1106 with reference to a target pixel 1105 in the search image and the template 1103 in the reference image is calculated. As an index of the similarity, a correlation calculation such as SSD (Sum of Square Difference), SAD (Sum of Absolute Difference), and normalized mutual correlation is used.

If a luminance variation between frames is rapid or sharp like a real video image, the normalized mutual correlation is mainly used. A calculation expression of a similarity score of the normalized mutual correlation is represented by expression (1) below.

$$R(x, y, x', y') = \frac{\sum_{i=-M_T}^{M_T} \sum_{j=-N_T}^{N_T} \{I_{(x,y)}(i,j) - \bar{I}\}\{I'_{(x',y')}(i,j) - \bar{I}'\}}{\sqrt{\sum_{i=-M_T}^{M_T} \sum_{j=-N_T}^{N_T} \{I_{(x,y)}(i,j) - \bar{I}\}^2} \sqrt{\sum_{i=-M_T}^{M_T} \sum_{j=-N_T}^{N_T} \{I'_{(x',y')}(i,j) - \bar{I}'\}^2}}$$

-continued where $$\bar{I} = \frac{1}{M_T N_T} \sum_{i=-M_T}^{M_T} \sum_{i=-N_T}^{N_T} I_{(x,y)}(i,j),$$

$$\bar{I}' = \frac{1}{M_T N_T} \sum_{i=-M_T}^{M_T} \sum_{i=-N_T}^{N_T} I_{(x',y')}(i,j)$$

In expression (1), symbols (x,y) and (x',y') indicate positions (coordinates) of the template 1103 in a reference image I and a search image I', respectively. Symbols $I_{(x,y)}(i,j)$ and $I'_{(x',y')}(i,j)$ indicate partial images.

As a result of calculating the similarity in the search area completely, a position at which the similarity is maximized is regarded as a corresponding point to calculate the motion vector. If there is no occlusion, motion vectors with the number of the target points 1104 set in the reference image are calculated. The motion vector is a vector in which a position of the target point in the reference image is set as a start point and a position of the corresponding point in the search image is set as an end point, and it is represented by expression (2) below.

$$(x,y,x',y')_i, i=1, \ldots, m$$

(m: NUMBER OF MOTION VECTORS) (2)

Polynomial fitting may be performed on the correlation score in the search range 1107 to calculate a peak position of the similarity with high accuracy, or processing of increasing the number of pixels may be performed on the template 1103 and the search image to calculate the motion vector or the locus of the corresponding point with accuracy of subpixel.

While the example of the block matching in which the target points 1104 are fixedly arranged in a grid array is described as above, a feature point where the motion vector is easily calculated may be extracted from the reference image to perform a vector search based on a position of the feature point as a target point. For the extraction of the target point, typically, an image processing filter such as a Harris operator is used. The Harris operator is disclosed in a literature "C. Harris and M. Stephens, 'A combined corner and edge detector', Fourth Alvey Vision Conference, pp. 147-151, 1988".

First, the Harris operator determines a window size W to calculate a differential image $(I_{dx}, I_{dy})$ in horizontal and vertical directions. For the calculation of the differential image, a Sobel filter or the like may be used. For example, as a filter, a 3×3 filter $h_x$ in which h=[1,√2,1]/(2+√2) is set in the horizontal direction to be arranged by three in the vertical direction and a 3×3 filter $h_y$ in which h is set in the vertical direction to be arranged by three in the horizontal direction to obtain the differential image $(I_{dx}, I_{dy})$.

Then, with respect to all coordinates (x,y) in the image, a matrix G represented by expression (3) below is calculated by using the window size W.

$$G = \begin{bmatrix} \sum_W I_x^2 & \sum_W I_x I_x \\ \sum_W I_x I_x & \sum_W I_y^2 \end{bmatrix} \quad (3)$$

The feature points are extracted in order from a coordinate (x,y) with a large minimum singular value of the matrix G. In this case, it is preferred that the feature points are not so concentrated. Accordingly, a restriction may be provided such that the feature points are not calculated in the vicinity of the window size W of the coordinate (x,y) where the feature points have already extracted.

Between continuous frames, the feature point may be obtained again to perform the template matching, or the template matching may be performed between new frames to track a locus of the feature point based on a terminal of the obtained motion vector as a target point. Alternatively, the key point matching may be performed by using a feature amount, as key information, between feature points calculated in the respective frames to perform the matching. For example, a redundant matching operation can be reduced by using a graph algorithm, and accordingly it is possible to perform efficient matching. As the efficient matching, a learning algorithm such as a random decision tree is used in many cases.

By using coordinate information $\vec{x}$ of the target point used in calculating the vector by the motion vector searcher 14, the calculated motion vector can be converted into a corresponding point representing a corresponding position for each frame. As represented by expression (4) below, the motion vector $\Delta \vec{x} = (\Delta x, \Delta y)$ is converted into the target point $\vec{x} = (x,y)$ and the corresponding point $x' = (x',y')$ ($\vec{x}$ means a vector of x).

$$\vec{x}' = \vec{x} + \Delta \vec{x} \quad (4)$$

At step S1004 in FIG. 10B, the position attitude acquirer 8 calculates the initial position change (initial attitude change) based on the motion vector calculated at step S1001. For example, it acquires, as an initial value, the position change (attitude change) obtained by integration of a differential position change amount (attitude change amount) of the image pickup apparatus 200 acquired by the vibration information acquirer 4 to have a total sum of motions between captured images as RGBD images input in this processing flow. The position change amount (attitude change amount) is obtained by non-linear optimization or a definite or repetitive calculation method such as a five-point method. These calculation methods are described in a literatures "D. Nister, 'An Efficient Solution to the Five-Point Relative Pose Problem', PAMI Trans. Vol 26, Issue 6, p.p. 756-770" and "F. Kahl, R. Hartley, 'Continuous Optimization Methods in Computer Vision', ECCV2006-Tutorial program".

When obtaining the position change (attitude change) of the image pickup apparatus 200 based on the motion vector, it is necessary to exclude, from a motion of an image, a motion of a moving object other than a motion of the image pickup apparatus 200 and an error motion vector. The error vector and the motion vector of the moving object constituted by a small area in the image are excluded together with RANSAC (random sample consensus). The position change amount (attitude change amount) of the image pickup apparatus 200 acquired from the depth information acquirer 3 or an integral value that represents the motion of the image pickup apparatus 200 during capturing the RGBD images is converted into an image motion by using a camera parameter. In this case, the image motion and the motion vector are compared (i.e., based on the similarity between the image motion and the motion vector), motion vectors quite different from the image motion are excluded as a motion vector of the moving object. If most of the vectors do not match or a three-dimensional modeling or a space mapping is not established on the assumption of a still object or a still scene, most of objects are determined as moving objects. In this case, the CPU 12 stops executing the processing or presents an error or a warning.

Subsequently, at step S1005, the position attitude acquirer 8 calculates, based on the position change (attitude change) calculated at step S1004 as an initial value, the position change (attitude change) between the input RGBD images with high accuracy by the three-dimensional registration using the pair of RGBD images. The RGBD images are input and for example, ICP algorithm is used to perform three-dimensional rigid fitting for the three-dimensional position change or attitude change of images. This method is disclosed in the literature "Takeshi Masuda, 'ICP algorithm', computer vision frontier guide 3, Advanced Communication Media, p.p. 33-60".

According to the processing described above, the relative position change (attitude change) between the arbitrary RGBD images can be obtained with high accuracy. In other words, it is possible to calculate a camera position amount (camera attitude amount) relative to each RGBD image with reference to a camera position (camera attitude) at the time of capturing a certain RGBD image while one of a pair of the arbitrary input RGBD images is fixed. The processing is called a self-position estimation, and it is an important element technology in a three-dimensional model estimation in an environment. A self-position estimation technology while the optical vibration-proof operation is not performed is a common technology as disclosed in Japanese Translation of PCT International Application Publication No. 2014-511591.

On the other hand, when performing the optical vibration-proof operation, the position change (attitude change) between the input RGBD images can be obtained with high accuracy by the processing including added steps as illustrated in FIG. 10B. At step S1002, the influence of the optical vibration-proof operation included in the motion vector is removed. Corresponding point information is processed by using the optical vibration-proof control information that represents an effect of the optical vibration-proof mechanism obtained by the optical vibration-proof control monitor 6. Accordingly, the effect of the optical vibration-proof operation, i.e., the parallel movement of an image which is performed to suppress the vibration, can be canceled. Then, the motion vector is converted into the corresponding point to perform the correction.

The optical vibration-proof control information is a physical quantity that represents a quantity of a coordinate change caused by the parallel movement of an image due to the effect of the optical vibration-proof operation. However, when the optical system 1 is a zoom lens, a parallel movement amount of the image changes with the change of a focal length even if a rotation amount of the image pickup apparatus 200 given by the vibration information acquirer 4 including the attitude sensor is the same. Accordingly, for easiness to handle the control, a combination of a plurality of control physical quantities constituted by the rotation amount and the parallel movement amount of the image pickup apparatus 200 and the focal length may be adopted. For example, a scaling value is determined such that one of the optical vibration-proof control information is multiplied by the focal length of the optical system 1 to be the parallel movement amount of the image on a sensor surface. In other words, an angle may be adopted as represented by expression (5) where e is a rotation of the image pickup apparatus 200.

$$Sh = f \tan \theta \approx f\theta, \theta = \tan(Sh/f) \approx Sh/f \quad (5)$$

In this case, a neutral position of the optical vibration-proof mechanism corresponds to a lens shift amount of zero. In expression (5), the focal length is handled by a pixel unit and accordingly a correction angle can be handled as a parallel movement amount in an image.

Lens shift amounts in a Yaw direction and a Pitch direction with respect to the optical axis OA of the image pickup apparatus 200 are denoted by Shy and Shp, respectively. In this case, shifted positions $x_{rev}$, $y_{rev}$, $x'_{rev}$, and $y'_{rev}$ are represented by expressions (6-1), (6-2), (6-3), and (6-4), respectively.

$$x_{rev} = x - Shy_{-1} \quad (6\text{-}1)$$

$$y_{rev} = y - Shp_{-1} \quad (6\text{-}2)$$

$$x'_{rev} = x' - Shy \quad (6\text{-}3)$$

$$y'_{rev} = y' - Shp \quad (6\text{-}4)$$

As a result, the movement of a display area caused by the optical vibration-proof control can be canceled. Symbols Shx and Shy represent vibration shift amounts in a current frame, and symbols $Shx_{-1}$ and $Shy_{-1}$ represent vibration shift amounts in a previous frame. In this step, this parallel movement calculation is applied to the calculated motion vector. The motion vector is converted into the corresponding point, and the influence of the optical vibration-proof operation at coordinates of the target point and the corresponding point is subtracted by using the optical vibration-proof control information in each of the pair of RGBD images in which the vectors are calculated, and then it is returned to the motion vector again. As a result, the influence of the optical vibration-proof operation can be canceled from the motion vector information.

Subsequently, at step S1003, the position attitude acquirer 8 corrects the influence of the optical vibration-proof operation in the RGBD image. It shifts an image from a reference point such as an upper-left point to cancel an image shift amount caused by the influence of the optical vibration-proof operation on an image plane obtained from the optical vibration-proof control information. By performing a parallel movement of the image based on expression (4), the influence of the optical vibration-proof operation can be canceled. The calculation in this case is performed with an opposite sign to that of the calculation for the coordinate performed at step S1002.

Subsequently, at step S1004, the position attitude acquirer 8 calculates the initial position change (initial attitude change) based on the motion vector where the influence of the optical vibration-proof control has been canceled at step S1002. Similarly to the case in which the optical vibration-proof operation is not used, an error vector and a motion vector of a moving object in a small area are removed together with RANSAC or the like. Furthermore, the position change amount (attitude change amount) of the image pickup apparatus 200 obtained by the depth information acquirer 3 or an integral value that represents a motion of the image pickup apparatus 200 during capturing the RGBD images is converted into an image motion by using a camera parameter. Then, the image motion and the motion vector are compared (i.e., based on the similarity between the image motion and the motion vector), motion vectors quite different from the image motion are excluded as a motion vector of the moving object. If most of the vectors do not match or a three-dimensional modeling or a space mapping is not established on the assumption of a still object or a still scene, most of objects are determined as moving objects. In this case, the CPU 12 stops executing the processing or presents an error or a warning.

According to the processing described above, a self-position (self-attitude) estimation of the image pickup apparatus can be achieved with high accuracy and high-quality three-dimensional data can be generated by using an image motion together with the position information (attitude information) of the image pickup apparatus from the sensor signal even when the optical vibration-proof control is performed.

As described above, the control apparatus of each embodiment includes a depth information acquirer 3, a position attitude acquirer 8, and an image processor (preprocessor 7 and three-dimensional information restorer 9). The depth information acquirer 3 acquires depth information of an object image. The position attitude acquirer 8 acquires position information or attitude information of an apparatus. The image processor generates three-dimensional information based on information relating to an optical vibration-proof state of the apparatus (output signal from an optical vibration-proof control monitor 6), the depth information, and the position information or the attitude information.

Preferably, the image processor generates data (original data such as 2.5D data), as the three-dimensional information, for modeling three-dimensional data (three-dimensional model data). Preferably, the image processor generates the three-dimensional information by modeling three-dimensional data.

Preferably, the image processor performs a reverse projection on image data including an image signal relating to the object image and the depth information so as to reduce a position displacement (viewpoint displacement of a captured object image) of a projection center of the apparatus generated by optical vibration-proof control to generate the three-dimensional information. More preferably, the image processor moves a principal point (nodal) as a reference point of the reverse projection depending on the optical vibration-proof state when performing the reverse projection. More preferably, the information relating to the optical vibration-proof state is information relating to an eccentric amount of an image blur corrector (correction member 11) generated by the optical vibration-proof control, and the position displacement is a viewpoint displacement of the object image which varies depending the eccentric amount.

Preferably, the image processor relates the image data to voxel data (data relating to three-dimensional points in a space) based on the information relating to the optical vibration-proof state, the depth information, and the position information or the attitude information to determine a contribution coefficient to the voxel data (S803) Then, the image processor synthesizes (combines) the image data based on the contribution coefficient to generate the three-dimensional information (S804). Preferably, the image processor corrects a deterioration of the image data (S801, S802), and performs the reverse projection on the corrected image data.

Preferably, the image processor calculates a position of a projection center of an image pickup apparatus generated by the optical vibration-proof control based on a parameter of an optical system (camera parameter) and information relating to the optical vibration-proof state. Then, the image processor performs the reverse projection, for a three-dimensional space coordinate, on image data including the image signal output from the image pickup element in each viewpoint of the image pickup apparatus and the depth information based on a position of the projection center. Preferably, the image processor includes a recorder (three-dimensional information restorer 9) that is capable of recording data for modeling three-dimensional data as the three-dimensional information. Then, the recorder records the information relating to the optical vibration-proof state in synchronization with gradation data relating to each color of R, G, and B and the depth information corresponding to each pixel of an image pickup element.

Preferably, the image pickup apparatus includes a vibration information acquirer 4 that acquires a position change amount or an attitude change amount of the image pickup apparatus, and a motion vector searcher 14 that searches a motion vector based on the image data. Then, the image processor performs the reverse projection based on vibration information obtained from at least one of the vibration information acquirer and the motion vector during the optical vibration-proof control to reduce an aberration and a distortion that are generated by the optical vibration-proof control. More preferably, the position attitude acquirer calculates, as initial information, attitude change information of the image pickup apparatus obtained from the vibration information acquirer, and calculates final attitude change information of the image pickup apparatus based on the initial information and the motion vector. More preferably, the position attitude acquirer removes information which is not relevant to a vibration of the image pickup apparatus (i.e., information other than information relating to the vibration of the image pickup apparatus) by using information relating to the optical vibration-proof control and information obtained from the vibration information acquirer. More preferably, the image pickup apparatus includes a controller (CPU 12) that controls the image processor. The controller determines whether to control the image processor to generate the three-dimensional information based on the motion vector obtained from the motion vector searcher.

The control apparatus in each embodiment is not only applied to the image pickup apparatus, but also applied to for example a mobile information terminal to which the image pickup apparatus is attached, an image processing apparatus which processes a captured image for postprocessing, and an image display apparatus including the image processing apparatus. In each embodiment, the image pickup apparatus is an image pickup apparatus integrated with a lens, but this embodiment is not limited to thereto. Each embodiment can be applied also to an image pickup apparatus which includes an image pickup apparatus body (camera body) and an interchangeable lens removably attached to the image pickup apparatus body.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, a control apparatus, an image pickup apparatus, a control method, and a non-transitory computer-readable storage medium which are capable of achieving high-quality and high-accuracy three-dimensional modeling or space mapping can be provided to reduce an influence of a motion blur in hand-held photographing or rolling shutter distortion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115082, filed on Jun. 5, 2015, which is hereby incorporated by reference herein in its entirety.

What is claimed is:

1. A control apparatus comprising:
a depth information acquirer configured to acquire depth information of an object image;
a position attitude acquirer configured to acquire position information or attitude information of an apparatus; and
an image processor configured to generate three-dimensional information based on information relating to an optical vibration-proof state of the apparatus, the depth information, and the position information or the attitude information, wherein
the information relating to the optical vibration-proof state is information relating to an eccentric amount of an image blur corrector located in an optical system of the apparatus.

2. The control apparatus according to claim 1, wherein the image processor is configured to generate data, as the three-dimensional information, for modeling three-dimensional data.

3. The control apparatus according to claim 1, wherein the image processor is configured to generate the three-dimensional information by modeling three-dimensional data.

4. The control apparatus according to claim 1, wherein the image processor is configured to perform a reverse projection on image data including an image signal relating to the object image and the depth information so as to reduce a position displacement of a projection center of the apparatus generated by optical vibration-proof control to generate the three-dimensional information.

5. The control apparatus according to claim 4, wherein the image processor is configured to move a principal point as a reference point of the reverse projection depending on the optical vibration-proof state when performing the reverse projection.

6. The control apparatus according to claim 4, wherein:
the position displacement is a viewpoint displacement of the object image which varies depending the eccentric amount.

7. The control apparatus according to claim 4, wherein the image processor is configured to:
relate the image data to voxel data based on the information relating to the optical vibration-proof state, the depth information, and the position information or the attitude information to determine a contribution coefficient to the voxel data, and
synthesize the image data based on the contribution coefficient to generate the three-dimensional information.

8. The control apparatus according to claim 4, wherein the image processor is configured to:
correct a deterioration of the image data, and
perform the reverse projection on the corrected image data.

9. An image pickup apparatus comprising:
an image pickup element configured to photoelectrically convert an object image formed via an optical system to output an image signal;
a depth information acquirer configured to acquire depth information of the object image;
a position attitude acquirer configured to acquire position information or attitude information of the image pickup apparatus; and
an image processor configured to generate three-dimensional information based on information relating to an optical vibration-proof state of the image pickup apparatus, the depth information, and the position information or the attitude information, wherein
the information relating to the optical vibration-proof state is information relating to an eccentric amount of an image blur corrector located in the optical system.

10. The image pickup apparatus according to claim 9, wherein the image processor is configured to:
calculate a position of a projection center of the image pickup apparatus generated by optical vibration-proof control based on a parameter of the optical system and information relating to the optical vibration-proof state, and
perform a reverse projection, for a three-dimensional space coordinate, on image data including the image signal output from the image pickup element in each viewpoint of the image pickup apparatus and the depth information based on a position of the projection center.

11. The image pickup apparatus according to claim 9, wherein:
the image processor includes a recorder capable of recording data for modeling three-dimensional data as the three-dimensional information, and
the recorder is configured to record the information relating to the optical vibration-proof state in synchronization with gradation data relating to each color of R, G, and B and the depth information corresponding to each pixel of the image pickup element.

12. The image pickup apparatus according to claim 10, further comprising:
a vibration information acquirer configured to acquire a position change amount or an attitude change amount of the image pickup apparatus; and
a motion vector searcher configured to search a motion vector based on the image data,
wherein the image processor is configured to perform the reverse projection based on vibration information obtained from at least one of the vibration information acquirer and the motion vector during the optical vibration-proof control to reduce an aberration and a distortion that are generated by the optical vibration-proof control.

13. The image pickup apparatus according to claim 12, wherein the position attitude acquirer is configured to:
calculate, as initial information, attitude change information of the image pickup apparatus obtained from the vibration information acquirer, and
calculate final attitude change information of the image pickup apparatus based on the initial information and the motion vector.

14. The image pickup apparatus according to claim 12, wherein the position attitude acquirer is configured to remove information which is not relevant to a vibration of the image pickup apparatus by using information relating to the optical vibration-proof control and information obtained from the vibration information acquirer.

15. The image pickup apparatus according to claim 12, further comprising a controller configured to control the image processor,
wherein the controller is configured to determine whether to control the image processor to generate the three-dimensional information based on the motion vector obtained from the motion vector searcher.

16. A control method comprising the steps of:
acquiring depth information of an object image;
acquiring position information or attitude information of an apparatus;
acquiring information relating to an optical vibration-proof state of the apparatus; and
generating three-dimensional information based on the depth information, the position information or the attitude information, and the information relating to the optical vibration-proof state, wherein
the information relating to the optical vibration-proof state is information relating to an eccentric amount of an image blur corrector located in an optical system of the apparatus.

17. A non-transitory computer-readable storage medium storing a program which causes a computer to execute a process comprising the steps of:
acquiring depth information of an object image;
acquiring position information or attitude information of an apparatus;
acquiring information relating to an optical vibration-proof state of the apparatus; and
generating three-dimensional information based on the depth information, the position information or the attitude information, and the information relating to the optical vibration-proof state, wherein
the information relating to the optical vibration-proof state is information relating to an eccentric amount of an image blur corrector located in an optical system of the apparatus.

* * * * *